United States Patent [19]

Imai

[11] 4,293,677
[45] Oct. 6, 1981

[54] CURABLE ORGANOPOLYSILOXANE COMPOSITION CONTAINING MICROCAPSULES

[75] Inventor: Takeshi Imai, Ichihara, Japan

[73] Assignee: Toray Silicone Company, Ltd., Tokyo, Japan

[21] Appl. No.: 157,928

[22] Filed: Jun. 9, 1980

[30] Foreign Application Priority Data

Jun. 4, 1979 [JP] Japan ................................ 54-68841

[51] Int. Cl.³ ...................... C08G 77/08; C08G 77/20
[52] U.S. Cl. .................................. 528/15; 260/37 S; 264/4; 428/402; 428/429; 428/447; 525/100; 525/475; 525/478; 526/279; 528/31; 528/901
[58] Field of Search ................... 526/279; 528/15, 31, 528/901; 428/402; 525/100

[56] References Cited

U.S. PATENT DOCUMENTS

| | | | |
|---|---|---|---|
| 3,192,181 | 6/1965 | Moore | 528/15 |
| 3,270,100 | 8/1966 | Jolkovski et al. | 264/4 |
| 3,344,111 | 9/1967 | Chalk | 528/15 |
| 3,383,356 | 5/1968 | Nielsen | 528/15 |
| 3,445,420 | 5/1969 | Kookootsedes et al. | 528/15 |
| 3,453,234 | 7/1969 | Kookootsedes et al. | 528/15 |
| 3,461,185 | 8/1969 | Brown | 528/15 |
| 4,123,604 | 10/1978 | Sandford | 528/15 |

FOREIGN PATENT DOCUMENTS

| | | |
|---|---|---|
| 36-9168 | 6/1961 | Japan . |
| 39-26823 | 11/1964 | Japan . |
| 42-13703 | 8/1967 | Japan . |
| 51-80685 | 7/1976 | Japan . |
| 1054658 | 1/1967 | United Kingdom . |

Primary Examiner—Stanford M. Levin
Attorney, Agent, or Firm—Roger H. Borrousch

[57] ABSTRACT

One package compositions of organopolysiloxane containing alkenyl radicals, organohydrogenpolysiloxane and a catalyst for the addition reaction can be prepared by using microcapsules which contain the organohydrogenpolysiloxane. The microcapsules have nonpermeable films which keep the organohydrogenpolysiloxane separated from the other reactive components. When the microcapsules are ruptured, the composition cures. These one-package compositions can be used as coating materials, potting materials for electrical equipment, release coatings and bonding agents.

6 Claims, No Drawings

CURABLE ORGANOPOLYSILOXANE COMPOSITION CONTAINING MICROCAPSULES

BACKGROUND OF THE INVENTION

1. Field of the Invention

This invention relates to the addition reaction type of organopolysiloxane compositions. More precisely, this invention provides organopolysiloxane compositions which can be stored in a one-package form for a long time in a stable state by covering an organohydrogenpolysiloxane which is a cross-linking agent with a nonpermeable film, and which can be cured by breaking this nonpermeable film at the time of application.

2. Description of the Prior Art

The addition reaction type of organopolysiloxane compositions have the characteristics that no reaction by-products are produced during curing and that curing proceeds uniformly and quickly in thick sections. For example, they have been widely utilized as bonding agents, potting materials and coating materials for electrical and electronic devices, molding materials, peelable coating materials for paper and films, and fiber treatment agents.

However, when an organopolysiloxane composition of the addition reaction type is prepared in one package containing all the indispensable components, storage stability is lost within a short period. Thus, there is the problem that a one-package form essentially cannot be prepared. As a result, all the indispensable components must be divided into two or three packages, or the components must be mixed immediately before use. In this case, there are the disadvantages of measuring the various components, of complicated mixing procedures and of limited pot life.

Catalyst systems for the addition reaction have been conventionally used to overcome these drawbacks. In particular, an attempt has been made to inhibit the catalytic activity of a platinum catalyst by including another additive. The following compounds have been proposed as additives for inhibiting this reaction: benzotriazole in U.S. Pat. No. 3,192,181, thiourea derivatives in British Patent Specification No. 1,054,658, acetylene derivatives in U.S. Pat. No. 3,445,420, acrylonitrile derivatives in U.S. Pat. No. 3,344,111, tetramethylguanidine carboxylate derivatives in U.S. Pat. No. 3,461,185, sulfoxide derivatives in U.S. Pat. No. 3,453,234 and halocarbon derivatives in U.S. Pat. No. 3,383,356. However, since the platinum catalyst has a strong catalytic activity, it is difficult to inhibit the catalytic function of the catalyst completely by using an additive. Therefore, the use of an additive for inhibiting catalytic activity is insufficient to allow the production of an addition reaction type of organopolysiloxane composition in a one-package form.

The inventor continued investigations to overcome the above-mentioned drawbacks. As a result, it was found that the organopolysiloxane of the addition reaction type can be prepared in a one-package form with excellent storage stability on the basis of a method which is essentially different from the above-mentioned method.

SUMMARY OF THE INVENTION

One package compositions prepared from alkenyl containing organopolysiloxanes, an organohydrogenpolysiloxane and a catalyst for the addition reaction are obtained by using organohydrogen polysiloxane which is contained in microcapsules of nonpermeable film. These one package compositions can be cured by rupturing the microcapsules.

DESCRIPTION OF THE INVENTION

This invention relates to an organopolysiloxane composition comprising (A) an organopolysiloxane having an average unit formula $$R_a SiO_{4-a/2}$$

wherein R represents a substituted or unsubstituted monovalent hydrocarbon radical and a has a value in the range of from 0.5 to 3, and said organopolysiloxane having at least two silicon-bonded alkenyl radicals per molecule, (B) an organohydrogenpolysiloxane having at least two silicon-bonded hydrogen atoms per molecule and the organic radicals bonded to silicon atoms are substituted or unsubstituted monovalent hydrocarbon radicals, said organohydrogenpolysiloxane being contained in microcapsules with a nonpermeable film, and (C) a catalyst for the addition reaction between (A) and (B).

The organopolysiloxane used in this invention, component (A), is represented by the average unit formula $$R_a SiO_{4-a/2}$$

in which R represents an unsubstituted monovalent hydrocarbon radical such as an alkyl radical, i.e. methyl, ethyl, propyl, butyl and octyl; an alkenyl radical, i.e. vinyl and allyl; and an aryl radical, i.e. phenyl, xylenyl, and naphthyl; or a substituted monovalent hydrocarbon radical with a halogen atom or an organic group, and a has a value of from 0.5 to 3. These organopolysiloxanes have at least two alkenyl radicals per molecule. These alkenyl radicals can be located at any position in the molecule. The other monovalent hydrocarbon radicals besides alkenyl radicals can be present as a single type in the molecule or as a mixture of two or more types. The molecular structure can be a straight-chain, branched-chain, cyclic, network or three-dimensional structure. Homopolymers or copolymers or mixture of homopolymers and copolymers can be used. The molecular chain terminus can be a triorganosilyl group (including alkenyl radicals), a hydroxyl group or an alkoxy group. The viscosity is not particularly critical. A range of organopolysiloxanes from a substance with a viscosity of 0.001 Pa·s (25° C.) to a gummy substance can be used. Moreover, a solid (in particular, a powder) which can be melted or at least softened temporarily by heating is also applicable. A substance with a viscosity ranging from 0.01 to 100 Pa·s (25° C.) is preferably selected. If desirable, an emulsion or a dispersion can be used.

Component (B) used in this invention is prepared in the form of microcapsules covered with nonpermeable film. The organohydrogenpolysiloxanes have at least two silicon-bonded hydrogen atoms per molecule. This is the most important component of the compositions of this invention. The nonpermeable film as specified in this invention is a film through which the components of the composition cannot substantially permeate through the microcapsule in either direction. Thus, the organohydrogenpolysiloxane enclosed within the microcapsule does not permeate out of the microcapsule and the other components do not permeate into the microcapsule. The organohydrogenpolysiloxanes used primarily have a straight-chain structure or cyclic structure. However, a branched-chain structure, network structure or three-dimensional structure can be included. Homopolymers or copolymers or mixtures of two or more types of polymers can be used. The organohydrogenpolysiloxanes have at least two silicon-bonded hydrogen atoms per molecule; however, the positions of hydrogen atoms in the molecule are not particularly critical. The organic radicals bonded to a silicon atom besides these hydrogen atoms can be substituted or unsubstituted monovalent hydrocarbon radicals. Examples of these radicals are as follows: alkyl radicals such as methyl, ethyl, propyl, butyl, or octyl; aryl radicals such as phenyl, xylenyl, or napthyl, or 3,3,3-trifluoropropyl. One type of these organic radicals can be present per molecule or two or more types of organic radicals can also be present. The viscosity of organohydrogenpolysiloxane generally ranges from 0.0005 to 50 Pa·s (25° C.) and preferably ranges from 0.001 to 10 Pa·s (25° C.). The organohydrogenpolysiloxanes are used as a cross-linking agent for component (A). The amount of component (B) is adjusted in a range such that the molar ratio of silicon-bonded hydrogen atoms in component (B) to silicon-bonded alkenyl radicals is 0.5/1 to 10/1. Generally, the proportion of component (B), the encapsulated organohydrogenpolysiloxane, ranges from 1 to 60 parts by weight to 100 parts by weight relative to component (A). However, this proportion can be exceeded as long as the above-mentioned molar ratio is attained.

The organohydrogenpolysiloxanes can be prepared in microcapsules covered with a nonpermeable film by conventional methods including chemical means, physicochemical means, physical means and mechanical means. For example, the following methods have been proposed: the coacervation method disclosed in Kokai Japanese Patent No. Sho 51 (1976)-80685, the interfacial polymerization method disclosed in U.S. Pat. No. 3,270,100, the in-situ polymerization method disclosed in Japanese Patent No. Sho 36 (1961)-9168, the method for curing a film in liquid disclosed in Japanese Patent No. Sho 39 (1964)-26823, the method of drying in liquid disclosed in Japanese Patent No. Sho 42 (1967)-13703. The substance for forming a film can be selected from the materials which can form a microcapsule for organohydrogenpolysiloxanes, and which can form the above-mentioned nonpermeable film. Examples of these film-forming materials are as follows: ethyl cellulose, cellulose nitrate, cellulose acetate phthalate, polymethyl methacrylate, acrylonitrile-styrene copolymer, polystyrene and epoxy resin. However, the applicable substances are not limited to those listed above. The average size of the microcapsules generally ranges from 1 to 1000 microns. However, it is preferably selected in a range of 10 to 500 microns in terms of dispersibility.

Component (C) used in this invention is a catalyst for cross-linking by the addition reaction between component (A) and component (B). The following catalysts are applicable: platinum catalysts such as chloroplatinic acid, alcohol-modified chloroplatinic acid, complexes of platinum and olefins, complexes of platinum and ketones, complexes of platinum and vinylsiloxanes, platinum supported on alumina or silica and platinum black, palladium catalysts such as tetrakis (triphenylphosphine) palladium and a mixture of palladium black and triphenylphosphine, and the rhodium catalysts disclosed in U.S. Pat. No. 4,123,604. The amount of the catalysts approximately ranges from 1 to 1000 ppm as an equivalence of the respective elements such as platinum, palladium and rhodium to component (A).

The compositions of this invention can be produced simply by mixing components (A), (B) and (C) mentioned above. However, special care must be taken in mixing component (B) in order to avoid breakage of the film surface of the microcapsules. In the compositions prepared above, the addition reaction essentially does not occur since component (B) is completely separated from the other components by the wall of the microcapsule in spite of the fact that the silicon-bonded alkenyl radicals of component (A), the silicon-bonded hydrogen atoms of component (B), and component (C) as a catalyst for the addition reaction are present at the same time. Therefore, no changes occur in the compositions when they are stored for a long time. The walls of the microcapsules are broken by an appropriate method which is suitable for the intended use, i.e. by pressure, heating, strong shear stress and addition of solvents which can dissolve the microcapsule film, immediately prior to application, and curing takes place quickly. However, the microcapsule walls can be broken by any means; the means are not restricted to those mentioned above.

In addition to the above-mentioned components (A), (B) and (C), if desirable, additives such as fillers, pigments, heat resistance improving agents, adhesive auxiliaries, flame retardants, mold preventive agents and reaction retardants can be added to the compositions of this invention. Examples of fillers are as follows: fumed silica, precipitated silica, quartz powder, diatomaceous earth, titanium oxide, aluminum oxide, zinc oxide, iron oxide, cerium oxide, mica, clay, carbon black, graphite, calcium carbonate, zinc carbonate, manganese carbonate, cerium carbonate, cerium hydroxide, glass fibers, glass beads, glass balloons, asbestos, and organic polymers. These fillers can be treated on the surface with silicone oil, organosilanes, organosilazanes and other organic compounds.

The compositions of this invention are applicable for all uses for the addition reaction type of organopolysiloxane compositions. For example, the compositions of this invention can be used as bonding agents, potting materials and coating materials for electrical and electronic components, molding materials, molding box materials, peelable coating materials for paper and films, and organic and inorganic fiber treatment agents.

Examples of this invention will be explained below. The examples are presented for illustrative purposes and should not be construed as limiting this invention which is delineated in the claims. "Parts" and "%" indicated by the following examples imply "parts by weight" and "% by weight," respectively. The viscosity was measured at 25° C.

EXAMPLE 1

Gelatin (10 parts) was added to water (200 parts) and disolved by heating at 70° C. A 5% aqueous NaOH solution was added to the solution and the resulting pH value was 9.5.

Methylhydrogen polysiloxane (20 parts) of the following formula

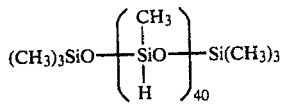

was mixed with paraffin wax (melting point 68° C., 4 parts) and a solution mixture was obtained by heating the mixture at 70° C. The above-mentioned aqueous gelatin solution was added to the above-mentioned solution mixture while stirring the mixture vigorously and an emulsion was obtained. A 10% aqueous Gum Arabic solution (pH 9.5) heated to 70° C. was added to the emulsion while stirring the mixture. The pH of the solution was reduced to pH 4 by adding a 10% aqueous acetic acid solution over a period of two hours. Subsequently, the temperature was increased to 50° C. at a rate of 1° C./min. for curing the microcapsule film. The microcapsules obtained were separated by filtration, washed with ethanol and dried in air. The microcapsules were examined with a scanning electron microscope. It was found that the size of the microcapsule was 100–200 microns and there was a uniform surface without any defects. The proportion of the solution within the microcapsule was 60%. The microcapsule film was easily broken by applying pressure and methylhydrogenpolysiloxane in the solution inside was discharged from the capsule.

Dimethylpolysiloxane having vinyldimethylsiloxane groups at both ends of the molecular chain (viscosity 5 Pa·s, 100 parts), quartz powder (50 parts) and an ethanol solution of chloroplatinic acid in an amount of 200 ppm as platinum content relative to dimethylpolysiloxane were mixed and the above-mentioned microcapsules containing methylhydrogenpolysiloxane (3 parts) were added to the above-mentioned mixture. A homogeneous commposition was obtained by stirring the mixture vigorously.

No changes occurred in the initial fluidity of this composition when the composition was stored in a container at room temperature for 6 months. After a 6-month storage period, this composition was applied in a small amount between two sheets of glass (5×5 cm) and the microcapsule film was broken by pressing the glass plates from both sides. Curing was completed after 20 minutes and a silicone rubber was obtained. When this composition was put in a stainless steel mold (12×22×0.2 cm) and a pressure of 30 kg/cm² was applied for 10 minutes at 100° C., a silicone rubber sheet was obtained.

EXAMPLE 2

Polyvinyl alcohol (degree of saponification 89%, 10 parts) and potassium persulfate (2 parts) were dissolved in water (200 parts). While this aqueous solution was stirred vigorously, a mixture of methylhydrogenpolysiloxane of the following formula

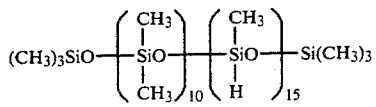

(10 parts) and styrene (2 parts) was added and an emulsion was obtained. Styrene was polymerized on the surface of the liquid droplets by heating the emulsion at 70° C. for 5 hours. As a result, microcapsules with a polystyrene exterior film were obtained. The microcapsules were separated by filtration, washed with water and dried in air. The microcapsules obtained were examined with a scanning electron microscope. It was found that the size of the microcapsules was 10–100 microns and the proportion of the contained solution was 80%. When the microcapsules were melted by heating at a temperature above 90° C., the solution containing methylhydrogenpolysiloxane was discharged from the microcapsules.

Dimethylpolysiloxane having vinyldimethylsiloxy groups at both ends of the molecular chain (viscosity 3 Pa·s, 100 parts) an ethanol solution of chloroplatinic acid in an amount of 10 parts as platinum content were mixed and the above-mentioned microcapsules containing methylhydrogenpolysiloxane (3 parts) were added to the above-mentioned mixture. The mixture was carefully mixed without breaking the microcapsule film. The initial viscosity was found to be maintained when this composition was stored in a container at room temperature for 6 months. After a 6-month storage period, a 200 ml beaker was filled with this composition to 80% of its volume. When the beaker was heated in an oven at 120° C. for 30 minutes, curing occurred even in the deeper portions and a silicone rubber was obtained.

EXAMPLE 3

Dimethylpolysiloxane having vinyldimethylsiloxane groups at both ends of the molecular chain (viscosity 0.1 Pa·s, 60 parts), a copolymer of 0.5 mol% of methylvinylsiloxane units and remaining dimethylsiloxane units having trimethylsiloxy groups at both ends of the molecular chain (viscosity 0.4 Pa·s, 40 parts), and a platinum-siloxane complex containing 10 ppm of platinum were mixed. The microcapsules of methylhydrogenpolysiloxane (5 parts) used in Example 1 were carefully added to the above-mentioned mixture. The composition obtained was found to be stable after 6 months.

This composition was applied thinly on high-grade kraft paper coated with polyethylene using a brush. After the coated surface was pressed twice manually using a rubber roller, the treated paper was placed in a hot air circulation oven at 150° C. for 30 seconds to cure the treated surface. When a cellophane tape was adhered on the treated surface, the film was found to be easily peeled off.

On the other hand, a Tetoron taffeta (plain woven fabric) of 50 denier degummed and desized filaments (10×20 cm) was immersed in this composition and the fabric was squeezed using two rubber rollers. The amount of silicone composition adhering was adjusted to 4% relative to the weight of the fabric. Subsequently, the fabric was heat-treated at 150° C. for 5 minutes. As a result, the treated fabric exhibited excellent waterproof property and water-repellency.

EXAMPLE 4

A 0.2% aqueous acetic acid solution was added to a mixture of $CH_3Si(OCH_3)_3$ (816 parts) $(CH_3)(CH_2=CH)Si(OC_2H_5)_2$ (480 parts) and $(C_6H_5)_2Si(OCH_3)_2$ (244 parts) to obtain a 90% aqueous solution relative to the theoretical quantities for hydrolysis. Subsequently, toluene and $NaHCO_3$ were added for neutralization. After washing with water and removing a volatile fraction, a liquid organopolysiloxane resin (viscosity 2.8 Pa·s) consisting of 60 mol% of monomethylsiloxane units, 30 mol% of methylvinylsiloxane units and 10 mol% of diphenylsiloxane units, in which the alkoxy group content was approximately 10%, was produced.

This liquid resin (100 parts), fumed silica (10 parts), quartz powder (10 parts), alumina (10 parts) and a platinum siloxane complex containing 20 ppm of platinum were mixed homogeneously. The methylhydrogenpolysiloxane microcapsules used in Example 2 (5 parts) were carefully mixed with the above-mentioned mixture.

A 200 ml beaker was filled with this composition to 80% of its volume. A cured resin product of an organopolysiloxane was obtained by heating the beaker in an oven at 120° C. for 30 minutes. This cured product was found to adhere very strongly to the interior wall of the beaker.

Separately, a 200 ml beaker was filled with this composition to 30% of its volume and toluene (80 ml) was added. After the mixture was stirred vigorously using a glass rod, a resinous material was obtained by curing for 15 minutes.

That which is claimed is:
1. An organopolysiloxane composition comprising
   (A) an organopolysiloxane having an average unit formula $R_aSiO_{4-a/2}$ wherein R represents a substituted or unsubstituted monovalent hydrocarbon radical and a has a value in the range of from 0.5 to 3, and said organopolysiloxane having at least two silicon-bonded alkenyl radicals per molecule,
   (B) an organohydrogenpolysiloxane having at least two silicon-bonded hydrogen atoms per molecule and the organic radicals bonded to silicon atoms are substituted or unsubstituted monovalent hydrocarbon radicals, said organohydrogenpolysiloxane being contained in microcapsules with a nonpermeable film, and
   (C) a catalyst for the addition reaction between (A) and (B).

2. The composition according to claim 1 in which (A) and (B) are present in amounts sufficient to provide a molar ratio of silicon-bonded hydrogen atoms to silicon-bonded alkenyl radicals of 0.5/1 to 10/1.

3. The composition according to claim 1 in which each R is selected from methyl, vinyl or phenyl radical, and the organic radicals of the organohydrogenpolysiloxane of (B) and methyl radicals.

4. The composition according to claim 2 in which each R is selected from methyl, vinyl or phenyl radical, and the organic radicals of the organohydrogenpolysiloxane of (B) are methyl radicals.

5. The composition according to claim 1 in which the catalyst (C) is a platinum catalyst.

6. The composition according to claim 4 in which the catalyst (C) is a platinum catalyst.

* * * * *